(12) United States Patent
Asakawa (10) Patent No.: US 12,472,600 B2
(45) Date of Patent: Nov. 18, 2025

(54) TURRET DEVICE

(71) Applicant: FUJI CORPORATION, Chiryu (JP)

(72) Inventor: Kazuya Asakawa, Toyota (JP)

(73) Assignee: FUJI CORPORATION, Chiryu (JP)

( * ) Notice: Subject to any disclaimer, the term of this patent is extended or adjusted under 35 U.S.C. 154(b) by 235 days.

(21) Appl. No.: 18/248,267

(22) PCT Filed: Nov. 11, 2020

(86) PCT No.: PCT/JP2020/042017
§ 371 (c)(1),
(2) Date: Apr. 7, 2023

(87) PCT Pub. No.: WO2022/102006
PCT Pub. Date: May 19, 2022

(65) Prior Publication Data
US 2023/0302596 A1 Sep. 28, 2023

(51) Int. Cl.
*B23B 29/32* (2006.01)
*B23Q 5/10* (2006.01)
(Continued)

(52) U.S. Cl.
CPC ............ *B23Q 16/02* (2013.01); *B23B 29/323* (2013.01); *B23Q 16/102* (2013.01); *B23B 3/162* (2013.01); *B23B 2260/008* (2013.01); *B23B 2260/044* (2013.01); *B23B 2270/025* (2013.01); *B23Q 5/10* (2013.01); *B23Q 11/08* (2013.01);
(Continued)

(58) Field of Classification Search
CPC ............ Y10T 29/5155; Y10T 29/5154; Y10T 82/2587; Y10T 29/5165; Y10T 29/5152–5167; Y10T 29/519; Y10T 408/37; Y10T 74/1494; B23B 29/32; B23B 23/323; B23B 29/24–29/34; B23B 39/20–205; B23Q 2220/002;
(Continued)

(56) References Cited

U.S. PATENT DOCUMENTS

2003/0113048 A1* 6/2003 Azumi ................ F16C 33/6625
384/475
2008/0118320 A1* 5/2008 Shozusawa ........ B23Q 11/0042
29/39

FOREIGN PATENT DOCUMENTS

EP     1 808 245 B1    7/2007
JP     5-5309 U        1/1993
(Continued)

OTHER PUBLICATIONS

International Search Report issued Dec. 28, 2020 in PCT/JP2020/042017 filed on Nov. 11, 2020 2 pages.

*Primary Examiner* — Erica E Cadugan
(74) *Attorney, Agent, or Firm* — Oblon, McClelland, Maier & Neustadt, L.L.P.

(57) ABSTRACT

A turret device having a configuration for obtaining required processing accuracy, includes: an indexing motor configured to pivotally index a turret tool; a turret shaft configured to transmit a rotation of the indexing motor; and a turret head coupled to the turret shaft on which multiple turret tools are mounted on a circumference, wherein the turret head includes a diaphragm-type base member coupled to the turret shaft, an inner diameter side of the base member is coupled to the turret shaft, and an outer diameter side of the base member is rotationally supported by a bearing fixed to a main body member of a turret.

1 Claim, 5 Drawing Sheets

(51) Int. Cl.
  *B23Q 11/08* (2006.01)
  *B23Q 16/02* (2006.01)
  *B23Q 16/10* (2006.01)
  *B23B 3/16* (2006.01)
  *F16C 23/06* (2006.01)
  *F16C 25/06* (2006.01)

(52) U.S. Cl.
  CPC ........ *B23Q 2220/002* (2013.01); *F16C 23/06* (2013.01); *F16C 25/06* (2013.01); *Y10T 29/5155* (2015.01); *Y10T 29/5167* (2015.01); *Y10T 74/1494* (2015.01); *Y10T 82/2587* (2015.01)

(58) Field of Classification Search
  CPC ..... B23Q 16/08–16/107; F16C 23/06–23/088; F16C 25/06–25/086
  USPC ........... 29/40, 39, 48.5 R, 35.5–48.5 A, 33 J; 82/159; 408/35; 74/813 L; 384/519, 384/583
  See application file for complete search history.

(56) References Cited

FOREIGN PATENT DOCUMENTS

| | | |
|---|---|---|
| JP | 5-138410 A | 6/1993 |
| JP | 2002-307212 A | 10/2002 |
| JP | 2003-251505 A | 9/2003 |
| JP | 2007-203449 A | 8/2007 |

* cited by examiner

TURRET DEVICE

TECHNICAL FIELD

The present disclosure relates to a turret device for pivotally indexing multiple turret tools mounted on a circumference.

BACKGROUND ART

Patent Literature 1 discloses a three-piece coupling structure used in a turret device of a machine tool. A fixing indexing clutch fixed to a hydraulic piston of a hydraulic cylinder is provided on a rear side of a turret, and a coupling for engaging with a coupling on a turret main body side is formed. The couplings are engaged by the movement of the fixing indexing clutch by the hydraulic pressure. That is, a coupling of a pivotally indexing clutch that has been positioned is aligned with a coupling of a stationary side indexing clutch with respect to the coupling of the fixing indexing clutch to complete an indexing clamp.

PATENT LITERATURE

Patent Literature 1: JPH05-5309U

BRIEF SUMMARY

Technical Problem

The above conventional example adopts a configuration for avoiding decrease in indexing accuracy due to a floating of an engaging portion between the couplings by a large force applied to the fixing indexing clutch. In the three-piece coupling, an annular coupling of a fixing annular indexing clutch is separated, a rear side of the coupling is held by an annular protruding section of a contact surface having a narrow width, and is coupled by multiple bolts via a spherical seat. As a result, even if the fixing indexing clutch is warped, since the coupling is held by the annular protruding section of the contact surface having a narrow width and is coupled by bolts via the spherical washer, the warp does not affect the coupling and uniform meshing is performed. Although such a configuration is because the correct meshing of the three-piece coupling affects processing accuracy, a configuration for obtaining the processing accuracy is conventionally demanded for the turret device.

Accordingly, it is an object of the present disclosure to provide a turret device having a configuration for obtaining required processing accuracy in order to solve the above-mentioned problem.

Solution to Problem

A turret device, according to one aspect of the present disclosure, includes an indexing motor configured to pivotally index a turret tool, a turret shaft configured to transmit a rotation of the indexing motor, and a turret head coupled to the turret shaft on which multiple turret tools are mounted on a circumference, in which the turret head includes a diaphragm-type base member coupled to the turret shaft, an inner diameter side of the base member is coupled to the turret shaft, and an outer diameter side of the base member is rotationally supported by a bearing fixed to a main body member of a turret.

Advantageous Effects

With the above configuration, in a case where a workpiece is processed by pivotally indexed turret tool from multiple turret tools mounted on a circumference of a turret head, since the turret head having a large diameter is deflected by receiving a processing external force, the inner diameter side of the base member which is a component member of the turret head is coupled to the turret shaft, and the outer diameter side of the base member is rotationally supported by the bearing fixed to the main body member of the turret, so that the required processing accuracy can be obtained by suppressing deflection during processing.

DESCRIPTION OF EMBODIMENTS

Figure 1:
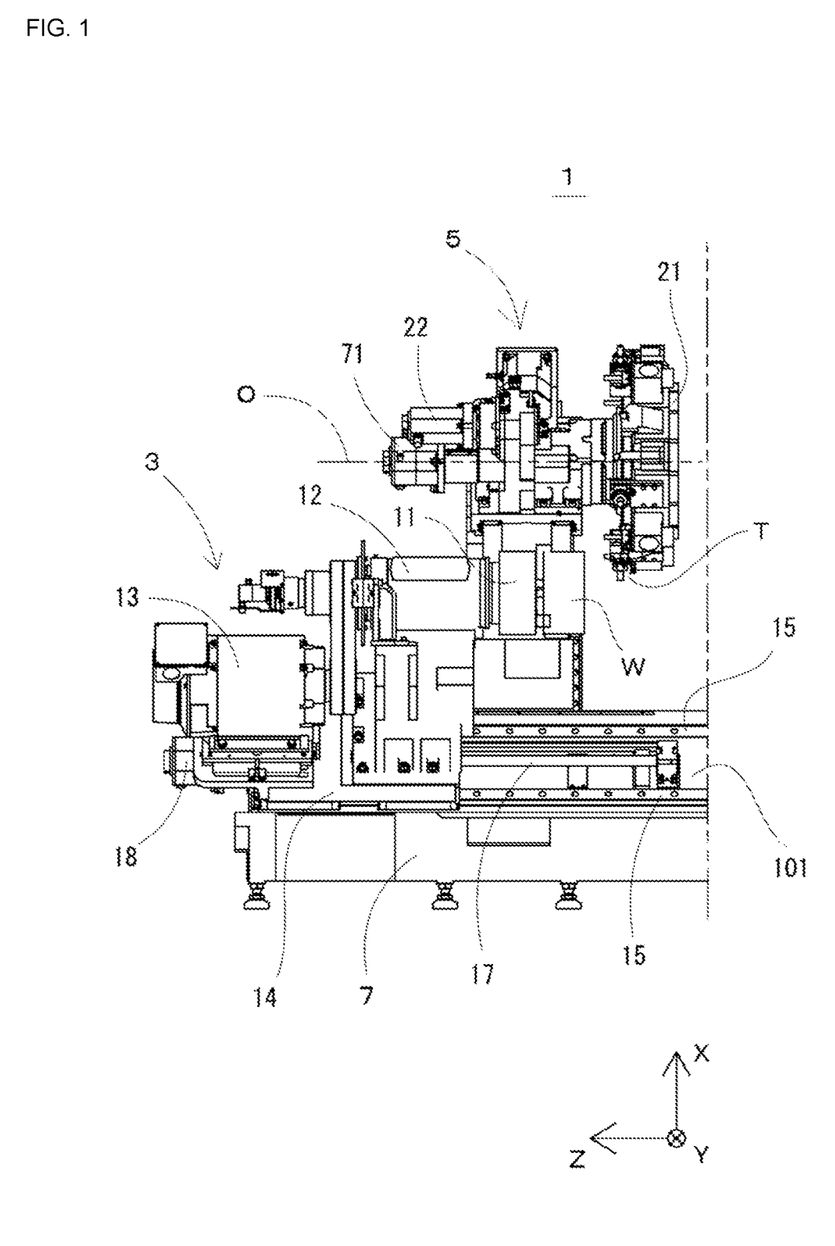
FIG. 1 is a front view illustrating a part of a configuration including a turret device of a multi-functional processing machine.
Figure 2:
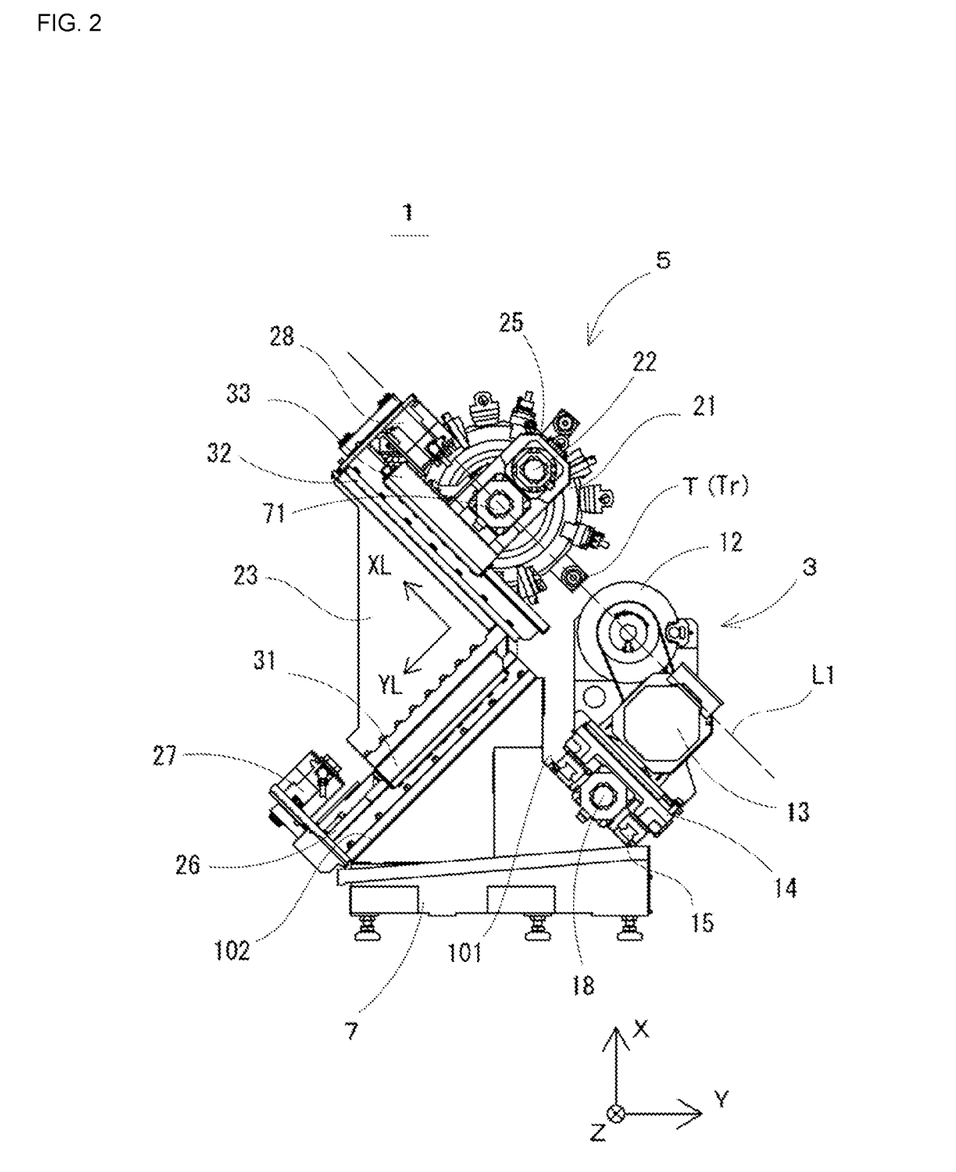
FIG. 2 is a side view illustrating the turret device of the multi-functional processing machine from a left side of FIG. 1.

One embodiment of a turret device according to the present disclosure will be described below with reference to the drawings. The turret device of the present embodiment constitutes a multi-functional processing machine having both functions of an NC lathe and a machining center. FIG. 1 is a front view illustrating a part of a configuration including a turret device of the multi-functional processing machine. FIG. 2 is a side view of the turret device illustrated from an outside (left side of FIG. 1). Multi-functional processing machine 1 is a two-opposed-spindle lathe in which workpiece main spindle devices 3 that impart rotation to gripped workpiece W, and turret devices 5 including multiple turret tools T used for processing on workpiece W are arranged bilaterally symmetrically with main spindles being on the same axis, and one of them is illustrated in the drawings. In multi-functional processing machine 1, a tool main spindle device (not illustrated) is provided between both lathes as a third tool rest.

In multi-functional processing machine 1, each device such as workpiece main spindle device 3 and turret device 5 is mounted on one base 7. Multi-functional processing machine 1 has a structure in which a dimension in a machine body front-rear direction is suppressed by adopting a slant bed type in which a mounting surface of base 7 is tilted in a front-rear direction. Workpiece main spindle device 3 is mounted on front side inclined surface 101 on a machine body front side, and turret device 5 is disposed at a high position on a machine body rear side. In particular, turret device 5 is configured to move in a YL-axis direction and an XL-axis direction having an angle of 45 degrees with respect to the horizontal direction and the vertical direction, and rear side inclined surface 102 parallel to the YL-axis is formed on base 7, and base slide 23 is movably assembled to rear side inclined surface 102.

In workpiece main spindle device 3, a spindle is rotatably incorporated in cylindrical-shaped main spindle stand 12, and chuck 11 for gripping and releasing workpiece W which is a processing target is provided at a tip portion of the spindle. On the spindle of main spindle stand 12, spindle motor 13 is disposed parallel to a rotation axis, and is configured such that a belt is bridged via a pulley fixed to each rotation axis, and the rotation is transmitted from spindle motor 13 to the spindle. On main spindle slide 14 tilted by front side inclined surface 101, main spindle stand 12 and spindle motor 13 are mounted to be positioned one above the other so as not to protrude forward.

Workpiece main spindle device 3 moves on base 7 along a Z-axis that is a machine body width direction. Therefore, two guide rails 15 parallel to the Z-axis are fixed to base 7, and a guide block provided on a lower surface of main spindle slide 14 slidably meshes with guide rail 15. A ball screw mechanism is provided for moving workpiece main spindle device 3. Screw shaft 17 parallel to the Z-axis is supported between two guide rails 15 via a bearing, and a rotation axis of Z-axis servomotor 18 is coupled. Screw shaft 17 passes through a nut member fixed to main spindle slide 14, and main spindle slide 14 is linearly moved in the Z-axis direction by the rotational output of Z-axis servomotor 18.

Next, turret device 5 of the present embodiment selects a corresponding one of multiple turret tools T by pivotal indexing and performs predetermined processing such as cutting on workpiece W. In turret device 5, multiple turret tools T are detachably attached to disk-shaped turret 21 at equal intervals on the circumference. Turret device 5 has indexing servomotor 22 for rotationally controlling turret 21, and is configured to position any turret tool T at a processing position on the circumference by the rotational control.

Turret tool T is attached to turret 21 such that a tip end of a bite, a drill, or the like faces an outside in the machine body width direction, and turret tool T is brought into contact with oncoming workpiece W from a machine body center side by moving workpiece main spindle device 3 in the Z-axis direction. In order to convey turret tool T to the processing position, turret device 5 is configured to move turret 21 in the YL-axis direction and the XL-axis direction as described above. As illustrated in FIG. 2, the YL-axis is higher toward the machine body front side, and conversely, the XL-axis is lower toward the front side, that is, toward workpiece main spindle device 3 side.

YL-axis guide rail 26 is fixed to rear side inclined surface 102 of base 7, and substantially triangular-shaped base slide 23 is slidably assembled. Base slide 23 is provided with guide section 31 that slidably meshes with YL-axis guide rail 26 on one side, and XL-axis guide rail 32 is provided on an adjacent side at 90°. Guide section 33 of turret slide 25 on which turret 21 is mounted slidably meshes with XL-axis guide rail 32. Both base slide 23 and turret slide 25 can be moved along the YL-axis and the XL-axis by a ball screw mechanism.

A screw shaft parallel to each of YL-axis guide rail 26 and XL-axis guide rail 32 is supported by a bearing, and the screw shaft passes through a nut member fixed to base slide 23 or turret slide 25. Each screw shaft is coupled to a rotation axis of YL-axis servomotor 27 or XL-axis servomotor 28 via a rotation transmission mechanism such that base slide 23 and turret slide 25 can be linearly moved by each rotational output. Turret device 5 can perform not only the movement control in each direction of the YL-axis and the XL-axis of turret 21 by the drive control of YL-axis servomotor 27 and XL-axis servomotor 28, but also the movement control in the horizontal direction in which the movements in both axial directions are combined.

When turret device 5 moves indexed turret tool T to the processing position, a position adjustment in the YL-axis direction is performed such that a straight line connecting a rotational center of turret 21 and a rotational center of the main spindle in workpiece main spindle device 3 is parallel to the XL-axis. At this time, the straight line connecting both rotational centers is defined as processing movement line L1. Accordingly, turret tool T of turret 21 is disposed on processing movement line L1 by pivotal indexing, and is positioned for processing on workpiece W by the movement in the XL-axis direction.

Turret device 5 of multi-functional processing machine 1 moves a position where turret slide 25 overlaps with workpiece main spindle device 3 in the front-rear direction, and turret tool T is disposed at the processing position where the turret tool overlaps with workpiece W in the Z-axis direction. At this time, it is necessary to increase the diameter of turret 21 so that turret device 5 does not interfere with workpiece main spindle device 3. However, the distance from rotation axis O to turret tool T mounted on the outer peripheral portion of turret 21 having a large diameter increases, thereby reducing the rigidity with respect to the processing external force by the increased distance. Such a decrease in rigidity results in a decrease in the processing accuracy performed in units of microns.

Figure 3:
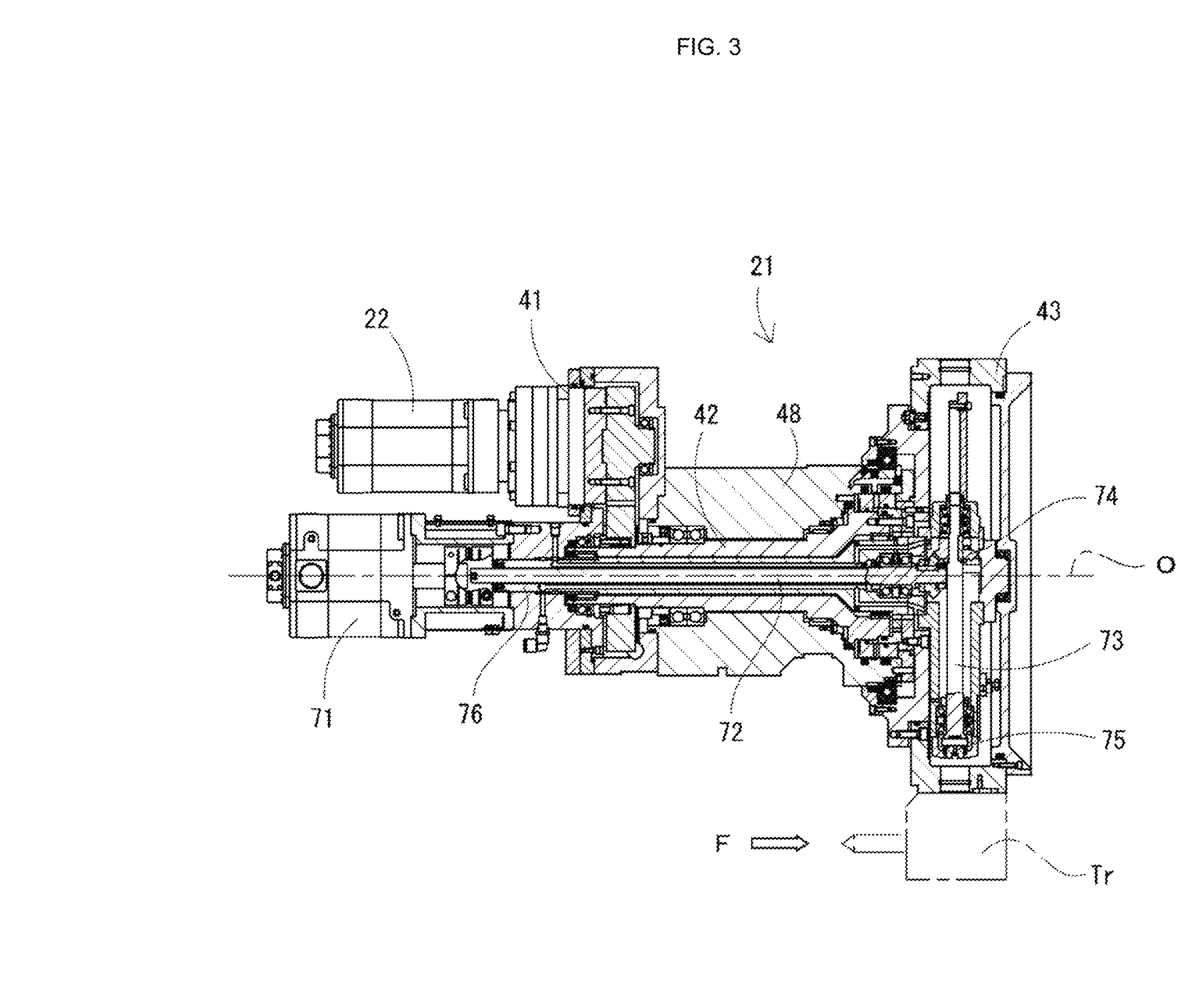
FIG. 3 is a sectional view illustrating a turret.
Figure 4:
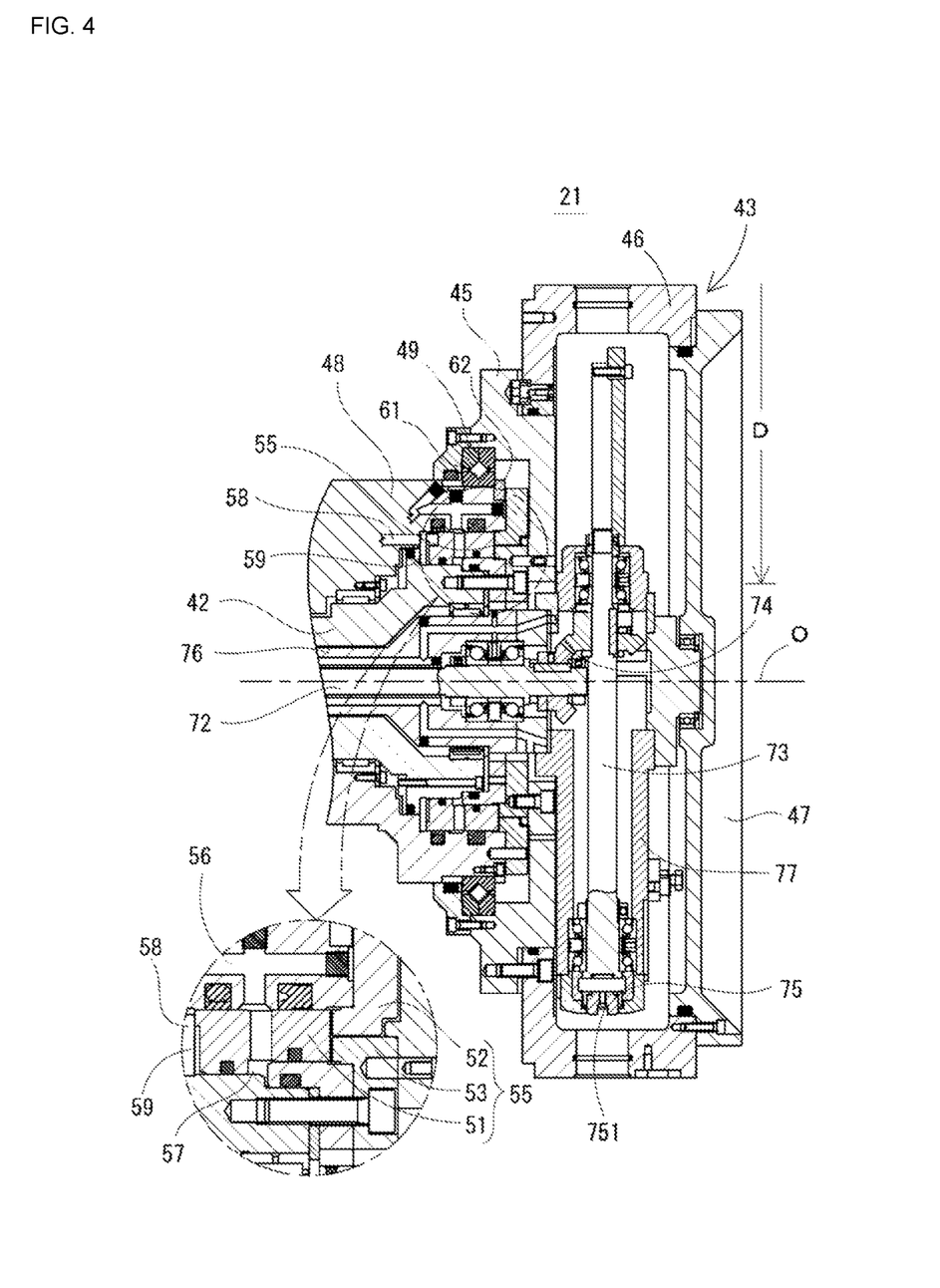
FIG. 4 is an enlarged sectional view illustrating a turret head part of the turret.

FIG. 3 is a sectional view illustrating turret 21, and FIG. 4 is an enlarged sectional view illustrating a turret head part of turret 21. Turret 21 is configured to transmit the rotation of indexing servomotor 22 to tubular-shaped turret shaft 42 via rotation transmitting section 41 of a planetary gear and a spur gear. Turret head 43 that integrally rotates is fixed to turret shaft 42. Turret head 43 is formed by integrally forming diaphragm-type base member 45, tubular-shaped turret head main body 46 having an outer peripheral surface where multiple turret tools T can be attached to and detached from, and lid member 47 closing the inside of turret head main body 46 from the opposite side of base member 45. In turret head 43, base member 45 is coupled to a tip end of turret shaft 42.

In turret head 43 of the present embodiment, turret head 43 has a large diameter as described above, and correspondingly, a diameter of base member 45 is formed to be large. Therefore, in a configuration in which base member 45 is merely supported by turret shaft 42 as in a conventional turret head, distance D from the fixed portion to turret tool T increases. Therefore, during the processing in which turret tool T is brought into contact with workpiece W, the deflection of base member 45 occurs due to the processing external force, so that the processing accuracy decreases.

In turret 21, cross roller bearing 49 (hereinafter, simply referred to as a "bearing") is provided between rotating base member 45 and cylindrical-shaped housing (main body member) 48. As a result, the inner diameter side of base member 45 is supported by turret shaft 42, and the outer diameter side thereof is supported by bearing 49 fixed to housing 48. Base member 45 is formed to be thin between the inner diameter side and the supporting portion on the outer diameter side, and the fixed portion on the outer diameter side that holds bearing 49 is formed to be thick. Therefore, turret head 43 has a high rigidity on the outer diameter side of base member 45 held by bearing 49, so that it can support the processing external force when turret tool T is brought into contact with workpiece W.

In turret 21, three-piece coupling 55 is assembled between turret shaft 42 and bearing 49 in order to position turret tool T in which pivotal indexing is performed in a pivot direction. Three-piece coupling 55 includes movable side coupling 53 fixed to base member 45, fixed side coupling 52 fixed to housing 48, and switching coupling 51 meshing with both of them. Switching coupling 51 is configured as a piston, and is displaced in a direction parallel to rotation axis O, so that the meshing and disconnecting between movable side coupling 53 and fixed side coupling 52 are switched to each other.

Switching coupling 51 is pressurized and displaced toward the left side of the drawing by the hydraulic oil supplied to pressurization chamber 57 through flow path 56, and the meshing between movable side coupling 53 and fixed side coupling 52 is disconnected. Meanwhile, switching coupling 51 is pressurized and displaced toward the right side of the drawing by the hydraulic oil supplied from the opposite side to pressurization chamber 59 through flow path 58, and meshes with movable side coupling 53 and fixed side coupling 52.

Turret tool T pivotally indexed by the pivoting of turret head 43 is positioned by the meshing of three-piece coupling 55, and workpiece W is processed. However, at this time, if a backlash occurs in the meshing of three-piece coupling 55, turret tool T moves as much as the gap of the backlash, so that the processing accuracy of workpiece W decreases. Therefore, turret 21 is configured to eliminate the backlash of three-piece coupling 55. As described above, since base member 45 having a large diameter is made to be easily deflected, turret 21 of the present embodiment utilizes its structural property.

While fixed side coupling 52 fixed to housing 48 is immovable, movable side coupling 53 can be minutely displaced in the direction parallel to rotation axis O. That is, base member 45 integrated with movable side coupling 53 has a fixed portion where base member 45 is fixed to bearing 49, and a portion from the fixed portion to the inner diameter side, which is formed to be thin, is easily deflected. Therefore, bearing 49 is sandwiched between spacer 61 and bearing presser 62 in a direction parallel to the rotation axis, and the position adjustment in the same direction is enabled by changing the thickness dimensions of both. By this adjustment, for example, the teeth of movable side coupling 53 are positioned about 0.01 mm closer to switching coupling 51 than the teeth of fixed side coupling 52. In the case of adjusting in an approaching direction, an adjustment in which spacer 61 is made thinner than in the present state and bearing presser 62 is made thicker is performed. Conversely, in the case of adjusting in a separating direction, spacer 61 is thickened, and bearing presser 62 is thinned.

Therefore, during the meshing of three-piece coupling 55, switching coupling 51 constantly deflects base member 45 slightly by the hydraulic pressure from pressurization chamber 59, so that movable side coupling 53 and fixed side coupling 52 can be meshed with each other with both teeth being aligned. This is because a deviation amount of about 0.01 mm created in advance by spacer 61 and bearing presser 62 corresponds to the backlash occurring in three-piece coupling 55 described above, and this deviation is always released when switching coupling 51 is meshed. Therefore, movable side coupling 53 and fixed side coupling 52 are meshed with each other without backlash.

In turret device 5 of the present embodiment, even in the case of turret 21 having a large diameter of turret head 43, since base member 45 is supported by bearing 49 on the outer diameter side closer to turret tool T that receives the processing external force, the deflection of turret head 43 is suppressed, so that high processing accuracy can be maintained. In addition, since turret 21 utilizes the property of base member 45 designed to be easily deflected to slightly deflect the inner diameter side supported by turret shaft 42, three-piece coupling 55 is appropriately meshed to prevent the backlash occurring during the processing, so that high processing accuracy in turret device 5 can be maintained.

Next, a rotating tool may be attached to turret 21 as turret tool T, so that tool servomotor 71 is provided on turret device 5 and is coupled to rotating shaft 72 passing through the center of housing 48. Rotating shaft 72 extends to the inside of turret head 43. Inside turret head 43, tool shaft 73 disposed in a radial direction is supported by a bearing, and rotating shaft 72 and tool shaft 73, which are orthogonal to each other, are coupled by the meshing of bevel gear 74. In rotating tool Tr (refer to FIG. 3) mounted on turret head 43, the key of the input shaft enters key groove 751 of clutch section 75 formed at a tip portion of tool shaft 73, so that the rotation of the drill is outputted by the driving of tool servomotor 71.

In turret 21, tubular-shaped turret shaft 42 is rotatably assembled in housing 48, and inside turret 21, tubular-shaped fixed shaft 76 is coaxially fixed to housing 48 side. Rotating shaft 72 is coaxially inserted to rotate inside fixed shaft 76. Inside turret head 43, bearing cover 77 is fixed at a tip portion of fixed shaft 76, and tool shaft 73 is rotatably incorporated in bearing cover 77, but tool shaft 73 and bearing cover 77 are not configured to be integral with turret head 43. Therefore, noise and vibration may occur during the processing on workpiece W using rotating tool Tr.

During the processing using rotating tool Tr, turret head 43 receives processing external force F by the pressing of the drill, so that a minute deformation may occur in turret head 43. This is because, as described above, base member 45 having large distance D between fixed positions is easily deflected. Therefore, processing external force F deflects turret head 43 side, but since the force does not act on tool shaft 73 side, relative displacement occurs between tool shaft 73 and rotating tool Tr, which causes noise and vibration during the processing. In turret 21 of the present embodiment, cam follower 78 is attached to bearing cover 77 as illustrated in FIG. 5.

Figure 5:
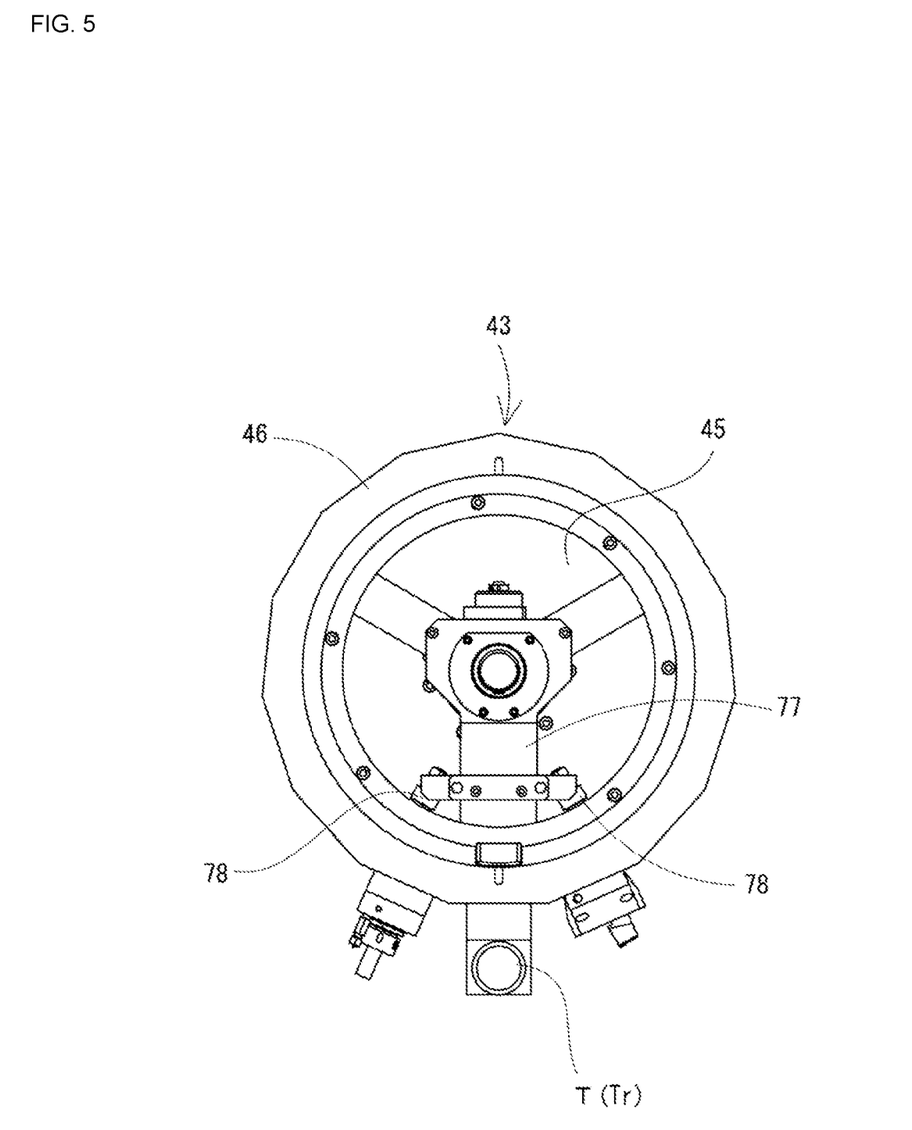
FIG. 5 is a front view illustrating the turret head illustrated in FIG. 3 from a right side.

FIG. 5 is a front view of turret head 43 illustrated in FIG. 3 from the right side, and illustrates an inside of turret head 43 excluding lid member 47. Two cam followers 78 attached to bearing cover 77 are disposed on the same circumference to be pressed against base member 45, and are configured to roll as base member 45 rotates. Therefore, cam follower 78 does not resist the pivoting of turret head 43 and holds the deflection of turret head 43 side due to the above-described processing external force F, and tool shaft 73 and bearing cover 77 follow the minute deflection of turret head 43. Therefore, the states of tool shaft 73, rotating tool Tr, and a driving transmission section are kept constant, so that noise and vibration generated during the processing on workpiece W can be prevented.

Although one embodiment of the present disclosure has been described, the present disclosure is not limited thereto, and various modifications can be made without departing from the gist thereof.

REFERENCE SIGNS LIST

1 . . . multi-functional processing machine, 3 . . . workpiece main spindle device, 5 . . . turret device, 21 . . . turret, 22 . . . indexing servomotor, 23 . . . base slide, 42 . . . turret shaft, 43 . . . turret head, 45 . . . base member, 46 . . . turret head main body, 48 . . . housing, 49 . . . cross roller bearing, 51 . . . switching coupling, 52 . . . fixed side coupling, 53 . . . movable side coupling, 55 . . . three-piece coupling, 61 . . . spacer, 62 . . . bearing presser, T . . . turret tool, Tr . . . rotating tool

The invention claimed is:

1. A turret device comprising:

an indexing motor configured to pivotally index a turret tool of multiple turret tools;

a turret shaft configured to transmit a rotation of the indexing motor; and a turret head coupled to the turret shaft, the multiple turret tools being mounted on a circumference of the turret head, the turret head including a base member coupled to the turret shaft, wherein the base member is coupled to the turret shaft at an inner diameter side of the base member, and the base member is rotationally supported by a bearing fixed to a main body member of the turret device, which bearing rotationally supports the base member at an outer diameter side of the base member, and wherein, inside the turret head, a tool shaft configured to transmit a rotation to one of the multiple turret tools is rotationally supported in a bearing cover, the bearing cover being integrally provided with a fixed shaft coaxial with the turret shaft, and, inside the turret head, a cam follower that is pressed against the base member and rotates is mounted against the bearing cover.

* * * * *